United States Patent [19]
Camp, III

[11] 3,973,893
[45] Aug. 10, 1976

[54] APPARATUS FOR CONTINUOUSLY MANUFACTURING BOARDS

[75] Inventor: Stafford V. Camp, III, Courtland, Va.

[73] Assignee: Southampton Manufacturing Company, Inc., Richmond, Va.

[22] Filed: July 7, 1975

[21] Appl. No.: 593,199

Related U.S. Application Data

[63] Continuation of Ser. No. 354,906, April 26, 1973, abandoned.

[52] U.S. Cl. .......... 425/324 R; 425/174.2; 425/371; 425/404; 425/405 R; 425/446; 425/328; 308/DIG. 1; 100/154

[51] Int. Cl.$^{2}$ .......... B29C 15/00; B29J 5/00

[58] Field of Search .......... 425/174.2, 324 R, 371, 425/404, 446, 90, 405 R, 224, 328; 308/DIG. 1; 100/154, 153, 152, 151

[56] References Cited

UNITED STATES PATENTS

| | | | |
|---|---|---|---|
| 2,779,969 | 2/1957 | Bose | 425/371 |
| 3,230,287 | 1/1966 | Caron et al. | 425/83 X |
| 3,340,795 | 9/1967 | Hartley | 100/154 |
| 3,620,158 | 11/1971 | Torelli et al. | 100/154 |
| 3,705,248 | 12/1972 | Hill et al. | 425/405 R |
| 3,795,470 | 3/1974 | DeMets | 425/371 |

FOREIGN PATENTS OR APPLICATIONS

| | | | |
|---|---|---|---|
| 356,676 | 3/1930 | United Kingdom | 308/DIG. 1 |

*Primary Examiner*—Robert L. Spicer, Jr.
*Attorney, Agent, or Firm*—Cushman, Darby & Cushman

[57] ABSTRACT

A mat formed of a mixture of board particles and a bonding agent is conveyed to oppositely rotating rollers which compress said mat to a desired thickness as the mat passes therethrough. A conveyor associated with the rollers is provided for carrying the compressed mat between a pair of platens mounted in a fixed relationship with respect to the continuously moving mat. As it passes between the platens, the mat is supported by a fluid bearing and is exposed to heat to cure the bonding agent.

4 Claims, 10 Drawing Figures

FROM AIR SUPPLY
FROM AIR SUPPLY
AIR SUPPLY
AIR SUPPLY

Fig. 5.
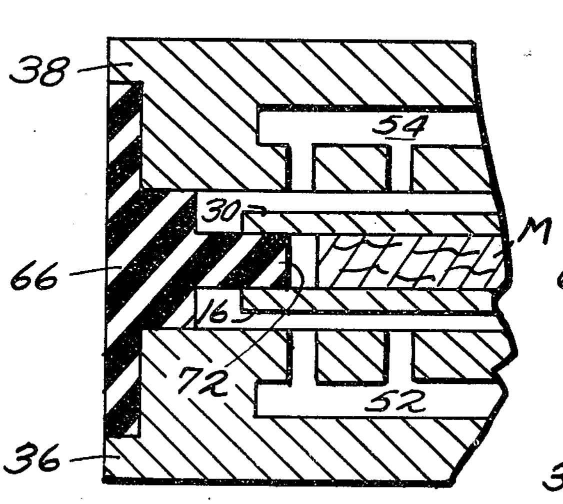
Fig. 6.
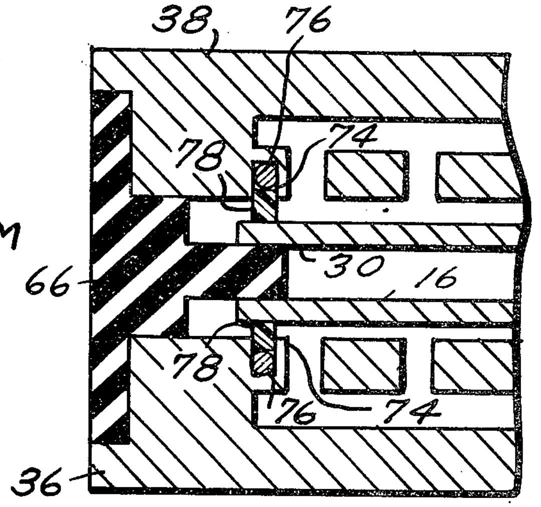
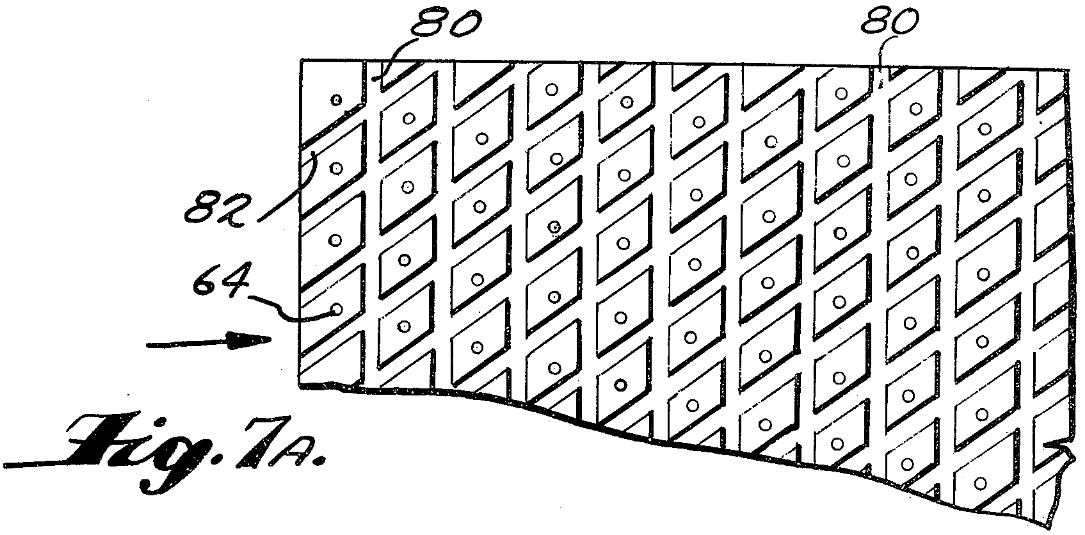
Fig. 7A.
Fig. 7B.
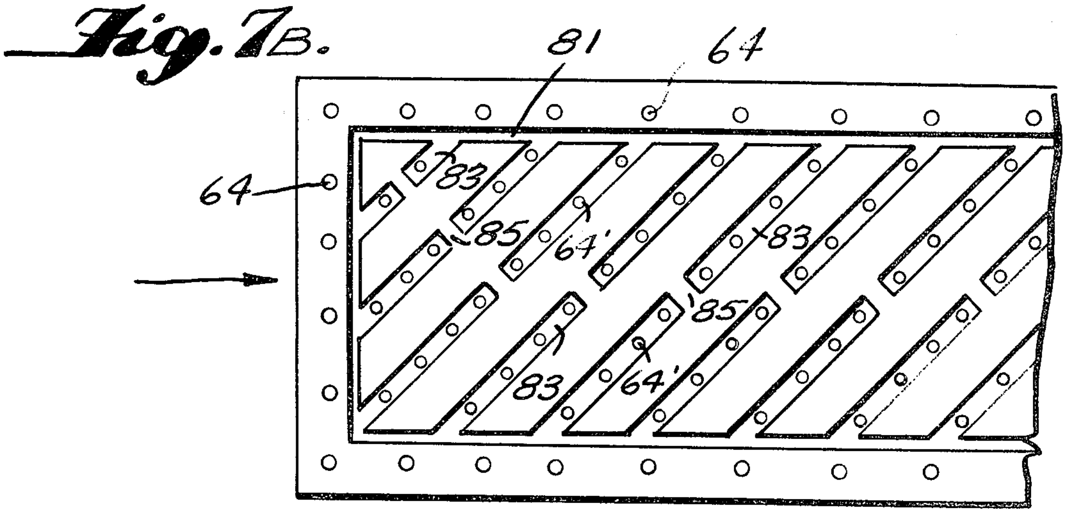

APPARATUS FOR CONTINUOUSLY MANUFACTURING BOARDS

This is a continuation of application Ser. No. 354,906 filed Apr. 26, 1973, now abandoned.

BACKGROUND OF THE INVENTION

The invention relates to the manufacture of particle board, hardboard, and laminated wood products and particularly to the continuous manufacture of such products utilizing an endless belt structure.

The conventional method of manufacturing particle board utilizes wood residues, fibers from wood chips, or similar wood products, mixes them with a resin or glue, places the mix in a stationary hydraulic press, compresses the material between two fixed platens to a desired thickness, and then heats the platens by applying steam through conduits therein. The application of heat for a given amount of time sets the resin. The platens thereafter are released and the board is trimmed to a desired size. The apparatus necessary to perform the above process requires an extremely large investment, not only in terms of the required machinery, but also in terms of the physical size of the manufacturing facility.

Furthermore, the conventional process has a disadvantage in that there is a substantial time element involved in the curing process, and the machine is effectively tied up for the curing period preventing the setup of the next cycle of operation. It obviously is more desirable to employ a continuous process wherein the particle board material is compressed, cured and delivered from an apparatus without the necessity of changing the machine configuration to perform these operations.

A process for continuous particle board manufacture also may be adapted to the manufacture of laminated plywood, wall paneling or the like. While the general thrust of the present disclosure is directed to particle board manufacture on a continuous basis, it should be understood that the system disclosed is readily adaptable to a number of manufacturing processes for board or like materials.

There are at least two continuous particle board manufacturing devices presently available. One of these utilizes two caterpillar track systems facing each other for feeding a mat into the machine at one end, compressing the mat therebetween into a board to a desired thickness, and then ejecting the cured board. However, as the machine wears, a problem faced is that there is deflection as the board material is passed through the machine. A formed board may result which has irregular surfaces because of this. Such a method of manufacture may require the boards to be sanded and finished after they are ejected from the machine. Such a step obviously lessens the efficiency of the method and associated apparatus. Additionally, the apparatus necessary to perform the various functions, especially the caterpillar-like tracks, requires the use of an enormous amount of steel. This is necessary, in order to limit, as much as possible, the deflection of the tracks due to the high working pressures required to compress the mat. It is also necessary to introduce heat into the track system, which is quite costly and complicated, for the purpose of curing the board. The heat loss through the mass of metal is great as is the heat required to bring the press up to the required temperature.

A second device for manufacturing board material on a continuous basis utilizes a drum which rides against a steel belt such that the material is fed between the belt and the drum. The material is heated by steam or other known heating systems as the drum rotates. The material is squeezed between the drum and belt to a desired thickness and is ejected at an output end in a fairly rigid form. The problem with this apparatus is that the drum limits the thickness of the boards obtainable by this process. For example, it has been almost impossible to deliver boards thicker than three-eighths of an inch by this process, because of the required bending of the board between the belt and drum. Unless the board is thin enough to bend around the periphery of the drum, the finished board will be destroyed before it can be ejected from the machine.

Curing is another problem faced in manufacturing particle board. One method of curing the board is by steam, but during application of steam heat to the boards, the outer surfaces of the boards are cure hardened by conductivity through contact with the heated platens and the like. Moisture trapped between the outer surfaces of the board has a tendency to form steam pockets under the surface of the board. When the pressure is released, the steam becomes rapidly unrestrained, causing a blowout of the particle board surface, thereby destroying the product and establishing a considerable waste factor.

Another method of curing is by the use of dielectric heating. However, the apparatus employed generally utilizes the stray field concept, which involves electrodes at spaced intervals generating a field which crosses through the mat to be cured. This method, while operable, has proved somewhat inefficient in application because, firstly, it is basically a preheater and not available during the final cure, and, secondly, the R. F. field produced at the electrodes must cross through the metal platens, thus absorbing some of the energy generated.

It is, therefore, an object of the present invention to provide an apparatus which obviates one or more of the limitations and disadvantages of the described prior arrangements.

It is another object of the present invention to provide a system which produces a particle board of any reasonable desired thickness on a continuous basis.

It is another object of the present invention to provide a system for the efficient continuous curing of a particle board under manufacture.

It is yet another object of the present invention to provide a simplified and inexpensive method of producing boards adaptable to such manufacture on a continuous basis.

SUMMARY OF THE INVENTION

An improved apparatus for the manufacture of board material on a continuous basis has been provided wherein a mat to be formed into the board is conveyed to an input end of the apparatus. Oppositely rotating rollers receive the mat and compress it to a point related to the desired thickness and density of the final board. A conveyor means associated with each opposed roller is provided for carrying the compressed mat between platens mounted in a fixed relationship to one another so that the mat is firmly positioned through out its traverse of the apparatus toward an output end thereof. During its travel between the platens, the mat is separated therefrom by a thin air film, and heat is applied to the mat to cure a bonding agent which constitutes one of the ingredients of the mat composition, thereby solidifying the board. Preferably the heat is generated by using one of the platens and one of the conveyors as electrodes in a dielectric heating arrangement having a high frequency power source, if thick board is desired and/or elevating the air temperature to a degree sufficient for curing if thin board is desired.

BRIEF DESCRIPTION OF THE DRAWINGS

FIG. 5 is a sectional view of a portion of a third embodiment of a platen arrangement;

FIG. 6 is a sectional view of a portion of a fourth embodiment of a platen arrangement;

FIG. 7A is a bottom plan view of a platen arrangement having improved air distribution characteristics;

FIG. 7B is a bottom plan view of a modified platen arrangement having improved air distribution characteristics;

DETAILED DESCRIPTION OF THE INVENTION

Figures 1, 2, 3, 4:
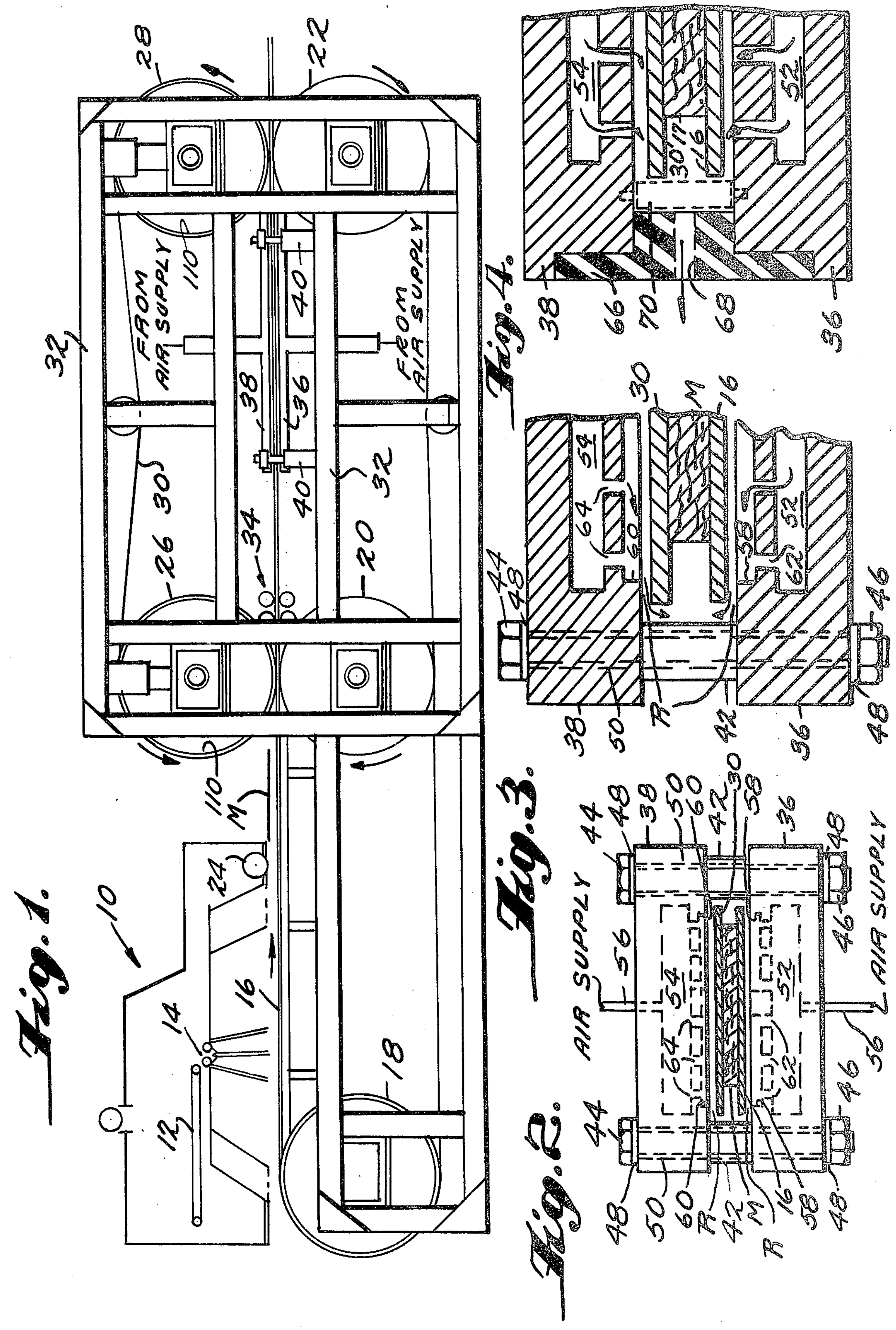
FIG. 1 is a side elevational view of the board manufacturing apparatus according to the invention.
FIG. 2 is a side elevational view of one embodiment of a platen arrangement which may be utilized in the apparatus of FIG. 1.
FIG. 3 is an enlarged sectional view of the lefthand portion of the platen arrangement of FIG. 2.
FIG. 4 is a sectional view of a portion of a second embodiment of a platen arrangement.

Referring now to the drawings, various embodiments of the invention will be described. FIG. 1 illustrates the general arrangement of components utilized in manufacturing a particle board. A conventional mat forming device is generally indicated by the numeral 10. This device distributes by means of a conveyor 12 a composition comprising fibrous wood particles, a bonding agent (such as a thermo-setting resin) and wax via a port 14 onto a further conveyor 16 which comprises an endless belt carried by rollers 18, 20 and 22. As the material is carried by belt 16, it passes a gauging portion 24 of the mat former 10 to produce a mat M of a thickness which is convenient for application to a subsequent dimensioning process.

A further roller 26 is paired with oppositely rotating roller 20 to serve as a compressing means. An additional roller 28 cooperates with a roller 26 to drive a second endless belt 30. Rollers 18, 20, 22, 26 and 28 are mounted on a frame 32 such that the belts 16 and 30 are in facing relationship and serve to engage the plane surfaces on opposite sides of mat M as the mat is carried through the apparatus.

Conventional means (not shown) are provided for controlling the spacing between rollers 20 and 26 so as to permit compression of the mat M to a desired thickness. In practice, the spacing between the rollers is set to be such that the mat is compressed to a thickness slightly less than the final desired thickness, for the mat as it leaves the compression rollers tends to swell. To contain the amount of such expansion, additional pinch rollers are provided downstream of rollers 20 and 26. These additional pinch rollers are generally designated by the numeral 34. While two pairs of rollers 34 are shown, it will be appreciated that any suitable number of suitable size may be utilized. Furthermore, if the material being processed is of low bulk density, it may be necessary to use rollers 20 and 26 as a gradual lead in to additional compression rollers located downstream therefrom.

After passing rollers 34, the mat is carried by belts 16 and 30 between a pair of platens 36 and 38 which are held in spaced parallel relationship and secured to frame 32 by a suitable clamping arrangement indicated by numeral 40. The details of the platens will be described hereinafter, but for present purposes it should be noted that each of the platens is supplied with fluid, preferably air, from a suitable supply. The internal construction of the platens is such that the air is distributed so as to impinge upon the surfaces of the belts 16 and 30 thereby forcing the belts into engagement with the mat surface and forming thin films of air between adjacent surfaces of the belts and the platens. This air film tends to prevent contact between the belts and the platens thereby eliminating wear which otherwise would be caused by sliding friction between these parts. As a back up means in case a section of the air system fails, the platen surfaces adjacent belts 16 and 30 are laminated with a fluorocarbon, such as Rulon possessing a low coefficient of friction. The pressure exerted by the belts against the mat maintains the desired thickness of the mat.

As will be explained hereinafter, during passage of the mat between platens 36 and 38, a heat cycle is performed so as to cure the mat, thereby fixing the dimension of the final board. The finished product is delivered downstream of rollers 22 and 28.

In the preferred embodiment of the invention, the belts 16 and 30 preferably are steel, but may be of any suitable substance possessing a low coefficient of friction. Consequently, by conventional means the belts can be heated to preheat the mat prior to the final curing step if so desired. The curing step is accomplished by a dielectric heating operation which utilizes the platens and/or the belts as electrodes if a thick board (i.e., over one-half inch) is desired. This method permits the mat to be uniformly heated to effect a proper curing in minimum time. If a thin board is desired, then air utilized in the air platen can be heated by conventional means to effect a proper cure.

Now that the broad description of the manufacturing process has been presented, structural details relating to the critical curing portion of the manufacturing process will be described.

FIGS. 2 and 3 illustrate a form of platen arrangement which may be utilized to carry out the process. The platens 36 and 38 are spaced at a fixed distance by spacers 42 formed of an insulating material. The clamps 40 of FIG. 1 are shown in the present embodiment as bolts 44 passing through the platens 36 and 38, the bolts being secured by nuts 46. The heads of the bolts and the nuts are electrically insulated from the platens by suitable washers 48. Additionally, the shafts of bolts 44 are insulated from the platens by cylindrical insulating sleeves 50. The necessity for these various insulating devices will become apparent hereinafter.

The interiors of platens 36 and 38 are provided with air chambers 52 and 54, respectively. While chambers 52 and 54 are shown as single compartments, it should be appreciated that if structural considerations dictate, suitable internal supports can be utilized to divide the chambers into sub-compartments which intercommunicate. Chambers 52 and 54 are joined to an air supply via conduits 56. The facing surfaces of platens 36 and 38 are provided with grooves 58 and 60, and these grooves communicate with the respective chambers 52 and 54 via a plurality of distribution holes 62 and 64. Consequently, air supplied to the platens via conduits 56 is distributed against the upper surface of belt 30 and the lower surface of belt 16. The widths of the grooves 58 and 60 are less than the widths of belts 16 and 30. This produces air flow restrictions, generally indicated as R, which exert back pressure on the system thereby controlling the escape of air past spacers 42. As a result, the belts 16 and 30 are forced against mat M with sufficient pressure from point loadings in the grooves which are close enough together longitudinally to overcome the mat' s tendency to swell. Additionally, the pressure in the systems causes the belts to be spaced from the platens by a thin film of air having a thickness in the order of 1 to 4 mils. This film prevents frictional wear between the platens and the belts.

FIG. 4 illustrates a second embodiment of a platen arrangement which may be utilized. This embodiment is similar to that just described except for the elimination of the grooves 58 and 60 and the addition of a spacer arrangement having a T-shaped cross-section. The spacers are designated by the numeral 66 and are formed of an electrical insulating material. The spacers are joined to platens 36 and 38 and extend the entire length of the platens thereby having the effect of preventing air from escaping outwardly from the edges of the belts 16 and 30 and platens 36 and 38. However, a controlled amount of escape is desirable. Accordingly, each spacer 66 is provided with a bore hole 68 which controls the fluid which is permitted to escape laterally of the platens. Obviously, with the spacer arrangement as shown, it is possible for air to proceed in the direction of the movement of the belts seeking escape at the ends of the platens. To control such escape, it is contemplated that cylindrical rollers be provided at opposite ends of the platen arrangement in the areas between spacer 66 and the edges of the belts, the rollers being rotatably supported by pins extending between platens 36 and 38. Such an arrangement is illustrated in dashed lines and is designated by the numeral 70.

A third embodiment of the platen arrangement is shown in FIG. 5. The configuration of the T-shaped spacer 66 has been modified from that shown in FIG. 4 to include a portion 72 which is dimensioned to the desired thickness of the board and which projects between belts 16 and 30. The roller arrangement 70 of FIG. 4 is eliminated in this embodiment so as to permit escape of air from the ends of the platen and no bore holes 68 are provided in the spacer.

To provide additional sealing, the FIG. 5 embodiment can be modified as shown in FIG. 6. This modification involves the machining in opposed faces of platens 36 and 38 recesses 74 along the length of the platens in positions overlapping the edges of the belts 16 and 30. Resilient members 76 having an O-shaped cross-section are inserted at the bottoms of recesses 74, and blocks 78 of electrical insulating material extend between the resilient members 74 and belts 16 and 30. The members 76 urge the blocks 78 into contact with belts 16 and 30 so as to reduce the amount of air which escapes laterally of the belts.

It has been found that in practice, utilizing platens with a number of distribution holes 64, flow of air through the distribution holes has been uneven. More particularly, air flow tends to be greatest through those holes adjacent the edges of the belts, while air flow through the more centrally positioned holes is less. This has the effect of producing stagnation of air at the central portion of the belt, and when this air is heated to assist in the curing process (as will be described hereinafter), the result is an uneven distribution of heat to the mat thereby causing inefficient and improper curing. To overcome this defect, the distribution holes of the several disclosed embodiments of platens 36 and 38 may be flanked by grooves in the underside of the platens to permit each distribution hole to have ready and immediate access towards the exterior edges of the platens. Such an arrangement is illustrated in FIG. 7A. As can be seen, the platen is provided with a plurality of spaced parallel grooves 80 extending from one edge of the platen to the opposite edge, while additional parallel grooves 82 are provided which extend in a direction inclined with respect to the first mentioned grooves 80. This permits the destribution holes 64 to be staggered in relationship to one another. Additionally, each hole 64 has a communication path through adjacent grooves 80 and 82 to the edges of the platen. The staggering of the holes 64 is provided so as to insure that the entire surface of the board will be exposed to the distributed air as the belt moves with respect to the platen in a direction shown by the arrow-head in FIG. 7A. When the air is heated, such an arrangement contributes to uniformity of the curing process.

While a cross-hatched arrangement of grooves is shown in FIG. 7A, it should be appreciated that the elimination of either grooves 80 or 82 is also possible while retaining the desirable feature of providing means for the air exiting centrally located holes 64 to proceed towards the edges of the platen. Additionally, the pattern of grooves and distribution holes, and the distance relationships between them, may be varied as required to produce an acceptable finished product.

A modified version of a grooved platen is shown in FIG. 7B. In this embodiment, the marginal edges of the platen are provided with distribution holes 64. Spaced inwardly from the edges of the platen is a groove 81 which communicates with a plurality of grooves 83 oriented at an angle of approximately 45° to the direction of belt movement shown by the arrow-head. Air distribution holes 64' are located within the grooves 83. The grooves 83 are separated by bridges 85. Accordingly, the application of air to the platen produces through holes 64 a full air bearing about the periphery of the platen and point loading on the belts by pressure developed in grooves 83 by air flow through holes 64'. Such an arrangement requires the consumption of considerably less compressed air than the arrangement of FIG. 7A.

Figure 8:
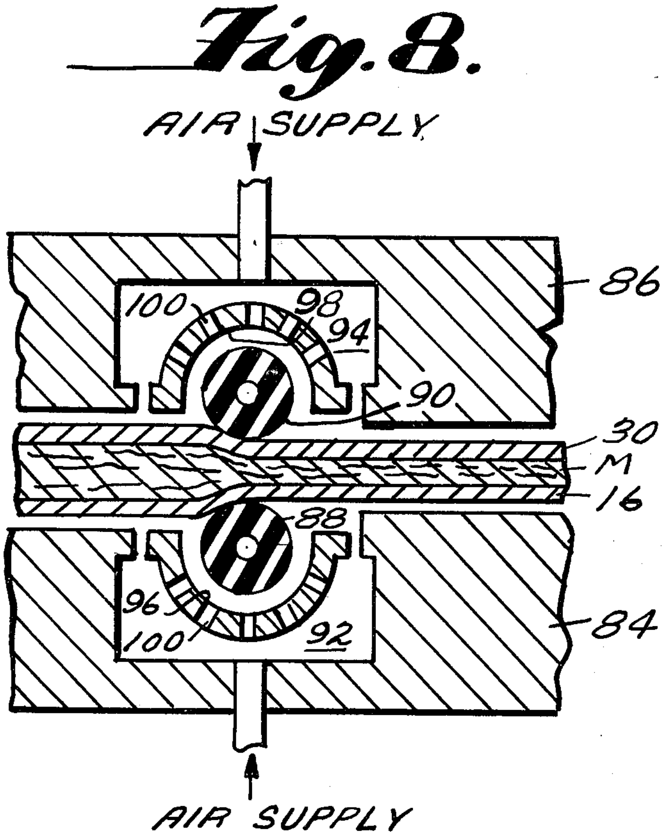
FIG. 8 is a sectional view of a portion of an auxiliary compression roller arrangement for sizing the mat.

It has been pointed out previously that rollers 20, 26 and 34 are utilized to properly size the mat M as it passes through the cycle of operation. However, particularly in the case of large mats, it may be desirable to include additional sizing apparatus between rollers 34 and the platens 36 and 38. Such an arrangement is shown in FIG. 8 and is particularly useful in controlling the substantial forces developed by the swelling characteristic of large mats.

A pair of housings 84 and 86, positioned on opposite sides of belts 16 and 30, are secured to frame 32 (FIG. 1) as are rollers 88 and 90 formed of electrical insulating material. The housings include air chambers 92 and 94 to receive air from the supply which serves platens 36 and 38. The housings 84 and 86 are provided with concave recesses 96 and 98 within which rollers 88 and 90 are positioned. Distribution holes 100 permit passage of air from chambers 92 and 94 to the interior of recesses 96 and 98 thereby impinging on rollers 88 and 90. The pressure developed by the air on the rollers counteracts the tendency of the rollers to deflect under the forces exerted by mat M. Consequently, the rollers can achieve their objective of uniformly reducing the thickness of mat M as shown in FIG. 8. The preferred use of the embodiment is to dimension the mat to its final thickness or slightly less than its final thickness when entering the platens so that no further compression is needed.

It has been stated hereinbefore that critical to the board manufacturing process is the curing operation, for it is this step which determines to a great extent the amount of equipment and space required to produce a satisfactory board. It is desirable to achieve a fast, uniform curing and to this end, the heating of belts 16 and 30 (mentioned above) is contemplated by the present invention in order to preheat the mat M prior to its reaching the main curing station between platens 36 and 38. Additionally, as pointed out hereinabove, the air supplied to the platens may be heated for curing purposes. Typically, this could take the form of heat exchange apparatus associated with the air compressor which transfers heat generated by the compressor to the air thereby raising the belt temperature to the order of 225° to 350° F. Also, the platens may include conventional means for receiving a supply of steam for curing, or they may incorporate radiant heating elements. However, each of these heating schemes is limited in respect of the thickness of the mat which may be cured as well as the speed of curing.

Figure 9:
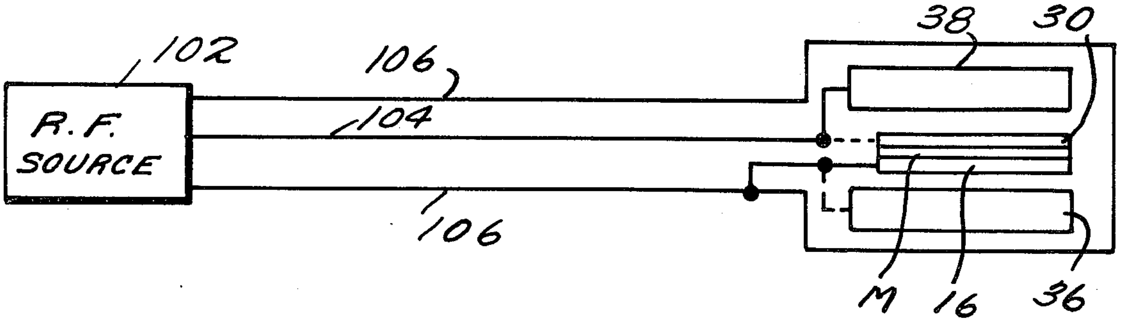
FIG. 9 is a block diagram of a dielectric heating arrangement for curing the manufactured board.

In order to permit rapid, uniform curing of mats of widely varying thickness, the present invention utilizes a dielectric heating operation which is illustrated in FIG. 9. A source of high frequency power, such as R.F. Source 102, is connected via line 104 to one electrode of the dielectric system. The electrode may be the belt 30, the platen 38, or either of these. The second electrode of the dielectric heating arrangement is either belt 16, or platen 36. This electrode is electrically joined to a shield 106, as shown. In FIG. 9 the belt 16 and platen 38 are illustrated in solid line connections, as the electrodes, while in dashed lines there is represented an arrangement wherein belt 30 and platen 36 are the electrodes. A conventional tuning strap (not shown) also comprises part of the heating arrangement.

Obviously, the use of a dielectric heating system requires precautions as to electrical shielding and insulating. To provide safeguards with respect to the electrical field produced by the arrangement, the shield 106 is placed about the system. Rollers 26 and 28 are supplied with layers of electrical insulating material 110 about their peripheries thus electrically insulating belt 30. In the case where belt 30 is used as an electrode, a layer of electrical insulating material is provided on the underside of platen 38 so as to prevent arcing between the belt and the platen. When platen 38 is the electrode, a substantially thinner layer of insulation is utilized.

Regardless of whether platen 38 or belt 30 is the electrode on one side of mat M, if belt 16 is the other electrode, no insulation is required on rollers 18, 20 and 22 so long as the belt is grounded through the rollers. Of course, if platen 36 is to serve as the second electrode, the rollers 18, 20 and 22 must be provided with insulating layers in the manner of rollers 26 and 28. The platens 36 and 38 are insulated from one another and from the frame of the machine by the insulating materials identified in connection with the description of FIGS. 2–6.

It is also apparent that the arrangements described in the preceding paragraph may be reversed. That is, the platen 36 or belt 16 may be held at a potential other than ground in which case the insulating requirements for the elements above and below the mat M are reversed since the elements above the mat would be grounded.

Should one or both of the belts be used as an electrode, an appropriate sliding connection would be required to join line 104 and/or shield 106 to the belt(s). Such connections are conventional and need not be described.

The foregoing describes preferred embodiments of an improved apparatus for continuously manufacturing boards of widely varying dimensions. However, it should be understood that many modifications are possible within the scope of the invention as covered by the claims which follow.

What is claimed is:

1. Apparatus for continuously manufacturing board from a mixture of board particles and a bonding agent, comprising:

means for forming a mat of said mixture;

compressing means for sizing said mat;

a pair of spaced platens;

a pair of endless belts which engage surfaces on opposite side of the mat and which carry the mat from the mat forming means past the compressing means and between said platens;

means associated with said platens for distributing fluid under pressure against said belts thereby developing fluid bearings between said platens and the belts and causing said mat to be dimensioned to its final size; and means for heating said mat as it is carried between said platens to cure said bonding agent to form the board from said mat.

2. Apparatus as set forth in claim 1, wherein each platen includes:

an internal chamber;

means for introducing fluid under pressure into said chamber; and a plurality of holes to permit fluid distribution from said chamber through a surface of the platen adjacent the belt thereby developing said fluid bearing.

3. Apparatus for continuously manufacturing board from a mixture of board particles and a bonding agent, comprising:

means for forming a mat of said mixture;

compressing means for sizing said mat;

a pair of spaced platens;

a pair of endless belts which engage surfaces on opposite sides of the mat and which carry the mat from the mat forming means past the compressing means and between said platens;

means associated with each of said platens for distributing fluid under pressure against said belts thereby developing fluid bearings between said platens and the belts, said distributing means including:

a. an internal chamber in the respective platen;

b. means for introducing fluid under pressure into said chamber;

c. a plurality of holes to permit fluid to pass from said chamber through a surface of the platen adjacent the belt to thereby develop said fluid bearing; and d. a plurality of grooves in each of said platen surfaces, said grooves flanking the holes and providing fluid flow paths towards the extremities of said platens; and means for heating said mat as it is carried between said platens to cure said bonding agent to form the board from said mat.

4. Apparatus for continuously manufacturing board from a mixture of board particles and a bonding agent, comprising:

means for forming a mat of said mixture;

compressing means for sizing said mat;

a pair of spaced platens;

a pair of endless belts which engage surfaces on opposite sides of the mat and which carry the mat from the mat forming means past the compressing means and between said platens;

means associated with each of said platens for distributing fluid under pressure against said belts thereby developing fluid bearings between said platens and the belts, said distributing means including:

a. an internal chamber in the respective platen;

b. means for introducing fluid under pressure into said chamber;

c. a plurality of holes located about the periphery of the platen in a platen surface adjacent the belt to permit fluid to pass from said chamber through said holes to thereby develop said fluid bearing;

d. a plurality of grooves in said platen surface within said periphery; and e. at least one addditional hole within each of said grooves to permit fluid distribution from the chamber to said grooves; and means for heating said mat as it is carried between said platens to cure said bonding agent to form the board from said mat.

* * * * *